United States Patent
Turner et al.

(10) Patent No.: US 9,187,325 B2
(45) Date of Patent: Nov. 17, 2015

(54) MOLTEN SALT ROLLING BUBBLE COLUMN, REACTORS UTILIZING SAME AND RELATED METHODS

(75) Inventors: Terry D. Turner, Idaho Falls, ID (US); Bradley C. Benefiel, Idaho Falls, ID (US); Dennis N. Bingham, Idaho Falls, ID (US); Kerry M. Klinger, Idaho Falls, ID (US); Bruce M. Wilding, Idaho Falls, ID (US)

(73) Assignee: Battelle Energy Alliance LLC, Idaho Falls, ID (US)

( * ) Notice: Subject to any disclaimer, the term of this patent is extended or adjusted under 35 U.S.C. 154(b) by 1041 days.

(21) Appl. No.: 13/188,202

(22) Filed: Jul. 21, 2011

(65) Prior Publication Data
US 2013/0020232 A1    Jan. 24, 2013

(51) Int. Cl.
*C01B 3/34* (2006.01)
*B01J 10/00* (2006.01)
*B01J 19/24* (2006.01)
*B01J 7/02* (2006.01)
*B01J 4/00* (2006.01)

(52) U.S. Cl.
CPC ............. *C01B 3/348* (2013.01); *B01J 4/001* (2013.01); *B01J 7/02* (2013.01); *B01J 10/002* (2013.01); *B01J 10/005* (2013.01); *B01J 19/246* (2013.01); *B01J 2204/002* (2013.01); *B01J 2219/00157* (2013.01); *B01J 2219/00159* (2013.01); *B01J 2219/0277* (2013.01); *C01B 2203/0216* (2013.01)

(58) Field of Classification Search
CPC ............... B01J 2219/00094; B01J 19/2435
See application file for complete search history.

(56) References Cited

U.S. PATENT DOCUMENTS

| | | | |
|---|---|---|---|
| 3,198,492 A * | 8/1965 | Schneider | 366/107 |
| 3,210,268 A | 10/1965 | Hendal et al. | |
| 3,803,205 A | 4/1974 | Shang et al. | |
| 3,096,015 A | 12/1976 | Hutchings | |
| 4,092,236 A | 5/1978 | Heredy | |
| 5,491,279 A | 2/1996 | Robert et al. | |
| 7,078,012 B2 | 7/2006 | Bingham et al. | |
| 7,153,489 B2 | 12/2006 | Bingham et al. | |

(Continued)

FOREIGN PATENT DOCUMENTS

CN    201634417 U    11/2010

OTHER PUBLICATIONS

Supplementary European Search Report for European Application No. 12818387, mailed Mar. 20, 2015.

*Primary Examiner* — Randy Boyer
(74) *Attorney, Agent, or Firm* — Holland & Hart, LLP (57) ABSTRACT

Reactors for carrying out a chemical reaction, as well as related components, systems and methods are provided. In accordance with one embodiment, a reactor is provided that includes a furnace and a crucible positioned for heating by the furnace. The crucible may contain a molten salt bath. A downtube is disposed at least partially within the interior crucible along an axis. The downtube includes a conduit having a first end in communication with a carbon source and an outlet at a second end of the conduit for introducing the carbon material into the crucible. At least one opening is formed in the conduit between the first end and the second end to enable circulation of reaction components contained within the crucible through the conduit. An oxidizing material may be introduced through a bottom portion of the crucible in the form of gas bubbles to react with the other materials.

16 Claims, 8 Drawing Sheets

(56) References Cited

U.S. PATENT DOCUMENTS

| | | |
|---|---|---|
| 7,279,077 B2 | 10/2007 | Bingham et al. |
| 7,294,323 B2 | 11/2007 | Klingler et al. |
| 7,665,328 B2 | 2/2010 | Bingham et al. |
| 2003/0147791 A1* | 8/2003 | Ding et al. .................... 422/227 |
| 2010/0313797 A1 | 12/2010 | Carabin et al. |
| 2011/0089377 A1* | 4/2011 | Bingham et al. .............. 252/373 |

* cited by examiner

MOLTEN SALT ROLLING BUBBLE COLUMN, REACTORS UTILIZING SAME AND RELATED METHODS

GOVERNMENT RIGHTS

This Invention was made under a Cooperative Research and Development Agreement between Western Hydrogen and Battelle Energy Alliance, LLC under Contract No. DE-AC07-05ID14517, awarded by the U.S. Department of Energy. The U.S. Government has certain rights in the invention.

TECHNICAL FIELD

The present invention relates generally to reactors and systems used in the production of gasses and more particularly, components and methods used in reactors such as alkaline metal reactors.

BACKGROUND

Hydrocarbon based fuels (including petroleum products, natural gas, etc.) have been, and remain, a major source of global energy production. Projections of global oil reserves, the desire to provide more "green" or environmentally friendly energy, and many other issues have motivated individuals, companies and governments to research possible energy production alternatives. These research and development efforts have included the search for improved techniques, systems and methods for producing energy from existing, known energy sources. For example, efforts have been made regarding the ability to extract oil located in geophysical locations that are difficult to reach using conventional technology. Additionally, efforts have been made to make existing energy processes more efficient, more cost effective, and more environmentally friendly.

Other efforts have focused on extracting energy from reserves that have largely been ignored in the past. In some cases, these resources or reserves have been ignored because they are not as carbon rich as other available resources. In other instances it is simply more difficult to convert the resource into a useable form of energy. For example, substantial efforts have been made to extract oil from sources such as tar sands and oil shale. While technically feasible, extraction of oil from such sources in the past has conventionally been considered inefficient and ecologically unfriendly.

Current research has also focused on potential new sources of energy as well as improvement of other existing alternative energy sources. For example, efforts to improve solar technology, wind energy production, bio-fuel production and hydrogen production are all ongoing. However, as those of ordinary skill in the art will recognize, all of these efforts are met with various obstacles, some economical, some political, and some scientific.

As such, it is an ongoing desire to provide new sources of energy, to improve energy extraction efforts, and to improve existing processes and techniques so as to provide energy more efficiently, more abundantly, and in a more environmentally friendly manner.

BRIEF SUMMARY OF THE INVENTION

Embodiments of the present invention are related reactors used in the production of gasses as well as systems and processes in which the reactors may be used. Additionally, various embodiments of the present invention are related to components used in reactors.

In accordance with one embodiment of the present invention, a reactor is provided. The reactor includes a furnace and a crucible positioned for heating by the furnace, the crucible defining an interior volume. A downtube is disposed at least partially within the interior crucible, wherein the downtube includes a conduit having an inlet at a first end and an outlet at a second end. The downtube further includes at least one opening formed in the conduit between the first end and the second end. The outlet and the at least one opening are configured to provide a recirculation path for any liquid material contained within the crucible.

In one embodiment, the at least one opening may be tapered at one end thereof. Additionally, the at least one opening may include a plurality of openings within the conduit between the first and second ends. In one particular embodiment, the cross-sectional area of the downtube, as taken substantially perpendicular to a longitudinal axis, is approximately half of the cross-sectional area of the crucible, as taken substantially perpendicular to the axis. A plurality of guide members may be coupled to the conduit to maintain the downtube in a desired position within the crucible. Additionally, a flow diversion structure may be associated with the conduit to direct any fluid flowing through the outlet in a desired direction or pattern.

In one particular embodiment, an inlet is provided at the lower end of the crucible for the introduction of an oxidizing material. A porous disc or screen may be positioned within the bottom of the crucible so that when the oxidizing material is introduced into the liquid contained within the crucible, a plurality of gas bubbles are formed within the liquid.

In accordance with another embodiment of the present invention, a gas processing system is provided. The system includes a supply of oxidizing material, a supply of hydrocarbon material and a reactor. The reactor includes a furnace and a crucible positioned for heating by the furnace. The crucible defines an interior volume and contains a catalyst material therein. A downtube is disposed at least partially within the interior crucible along an axis. The downtube includes a conduit having a first end, a second end and at least one opening between the first end and the second end. The first end of the conduit is in fluid communication with the supply of hydrocarbon material and the second end provides an outlet into the interior volume of the crucible. The outlet and the at least one opening define a recirculation path for the catalyst material within the crucible. The supply of oxidizing material may be coupled with an inlet formed in a lower portion of the crucible. A porous structure may be placed in the lower portion of the crucible such that the oxidizing material first passes through the porous structure and then into the catalyst material contained within the crucible as a plurality of gas bubbles.

In one particular embodiment, the catalyst material of the system includes a salt such as, for example, sodium carbonate. The supply of hydrocarbon material may include residual bitumen and the supply of oxidizing material may include water.

In accordance with yet another embodiment of the present invention, a downtube for use in the interior volume of a crucible of a reactor is provided. The downtube comprises a conduit having a first end and a second end. A flow diversion structure is located adjacent the second end of the conduit and coupled to the conduit. At least one opening formed in the conduit between the first end and the second end. A plurality of guide members may be coupled with the conduit and extend radially outward from the conduit. A splash guard may be coupled with the conduit and located between the at least one opening and the first end of the conduit. In one particular embodiment, the flow diverter may exhibit a substantially spherical geometry.

In accordance with a further embodiment of the present invention, a method is provided for controlling a reaction within a reactor. The method comprises providing a salt bath within a crucible, introducing a hydrocarbon material into the salt bath through a conduit disposed at least partially within the crucible, introducing an oxidizing material into the salt bath at a bottom portion of the crucible, and providing a recirculation path through the conduit for the salt bath.

The method may include providing one or more openings in the conduit and flowing the salt bath through the opening and back through the conduit. The oxidizing material may be introduced into the salt bath at a location near the bottom of the crucible as a plurality of bubbles, causing the salt bath to rise and flow into the opening in the conduit.

In one embodiment, providing a salt bath may include providing sodium carbonate, while the oxidizing material may be provided as water and the hydrocarbon material may be provided as residual bitumen.

Other various components and acts may be included in these apparatuses, systems and methods as described below and as will be appreciated by those of ordinary skill in the art.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Significant effort has been focused on energy conversion, energy efficiency, and the optimal use of resources in meeting the energy demands of mankind. The present disclosure describes reactors and that may be used in extracting an energy source (e.g., hydrogen or other gases) from a given material. Various components and methods associated with such reactors are also set forth herein. One embodiment of the present invention described herein includes an alkaline metal reactor that processes materials in a manner referred to as alkaline metal reforming (AMR). However, various aspects of the described inventions may be applicable to a spectrum of energy conversion.

One benefit of using an AMR process is that a wide range of feed materials may be reformed into a more useful energy source. Feed materials generally include an oxidizing material and some form of hydrocarbon, though straight carbon is also useable. In one embodiment, the hydrocarbon material may include a residual bitumen material that is sometimes referred to as "resid." Resid material may also sometimes be referred to as vacuum residuum (VR). Resid or VR materials are similar to road tar or asphalt and may be produced during the vacuum distillation of crude oil. These materials are generally perceived has having a low economic value. Resid composition is largely carbon with a small percentage of hydrogen, even less sulfur and other trace elements as will be recognized by those of ordinary skill in the art.

In accordance with one AMR process of the present invention, used waste products and water may be fed into an alkali metal salt bath at high temperatures. The resulting chemistry reaction will produce hydrogen, carbon monoxide, and carbon dioxide, along with a few other less significant gases. A high temperature furnace may be used to heat a crucible containing the salt bath. Once the desired temperatures are reached, both the resid and water are introduced into the salt bath, which acts as a catalyst to produce the desired gas products. The resulting gases can be separated and marketed as pure gases, i.e. hydrogen, carbon monoxide, and carbon dioxide. Alternately, the gases can be combined into a synthesis gas (syngas) used to produce fertilizers, chemicals, fuels, and other products. An example of such a process is set forth in U.S. patent application Ser. No. 13/188,167entitled SYSTEM AND PROCESS FOR THE PRODUCTION OF SYNGAS AND FUEL GASSES, filed on even date herewith, the disclosure of which is incorporated by reference herein in its entirety.

Figure 1:
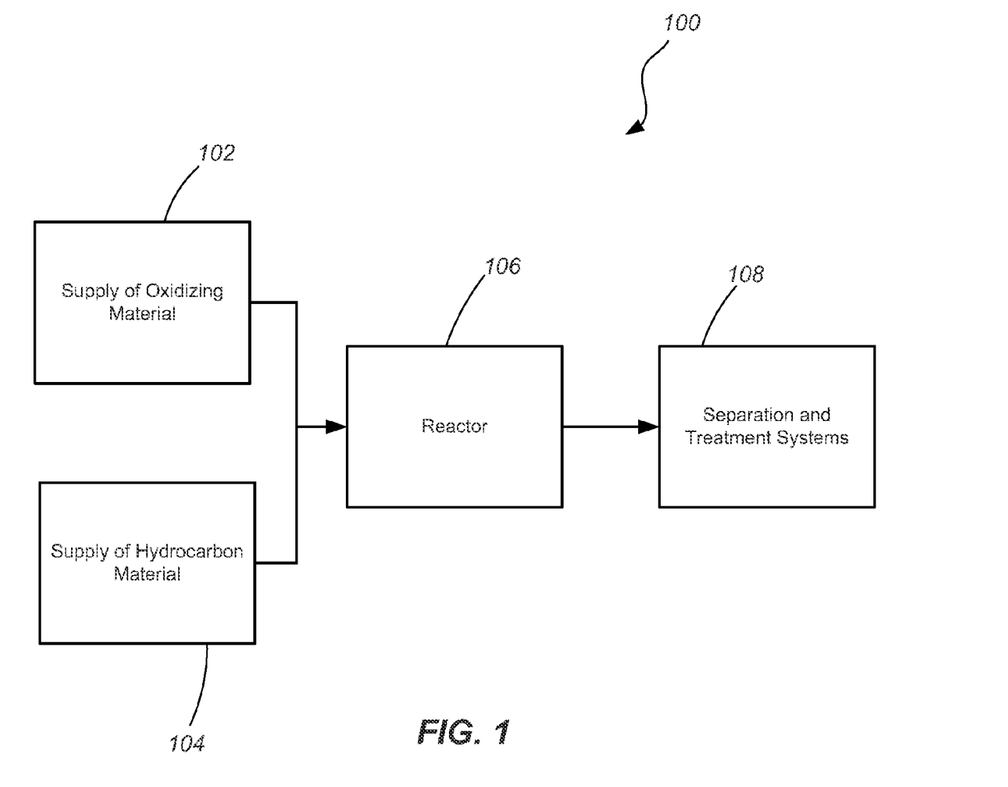
FIG. 1 is a schematic diagram showing a system including a reactor in accordance with an embodiment of the present invention.

Referring first to FIG. 1, a general overview of a system 100 and process is shown for the production of gasses using feed materials such as set forth above. The system 100 includes a source or supply of an oxidizing material 102. In one embodiment, the supply of oxidizing material 102 may include conditioned water that is maintained with a desired chemistry and at a desired temperature and pressure. The system 100 additionally includes a source or supply of hydrocarbon material 104. As noted above, the supply of hydrocarbon material 104 may include resid material. In other embodiments, different oxidizing and hydrocarbon materials may be utilized. As with the source of oxidizing material 102, the source of hydrocarbon material 104 may be maintained in specified conditions (e.g., temperature and pressure) in preparation for introduction into the reactor 106.

The reactor 106, which will be described in further detail below, may include a molten bath of salt or other material into which the oxidizing material and the hydrocarbon material will be introduced for reaction therewith. In one embodiment, the molten salt may include sodium carbonate, the hydrocarbon may be supplied as a resid material, and the oxidizer may include water in steam form. The chemical reaction that takes place within the reactor 106 produces gasses, liquids and solids. In one embodiment, using water and resid materials as reaction components to be introduced into a molten salt bath of sodium carbonate, sodium hydroxide will be generated from the interaction of sodium carbonate and steam. The sodium hydroxide, carbon, and water will then react to generate sodium carbonate and hydrogen. The hydrogen, along with other reaction products, will leave the salt bath as a gas for further processing while the sodium carbonate will remain in the salt bath for subsequent reactions.

Various separation and treatment systems 108 may be used to separate and treat the products obtained from the reaction within the crucible 110 and to provide desired usable products such as, for example, hydrogen, methane, and other gasses. Water, salt and other products may also be separated out and recycled back to the reactor 106. Various controls may be used in association with the system such as described, for example, in the previously incorporated U.S. Patent Application entitled SYSTEM AND PROCESS FOR THE PRODUCTION OF SYNGAS AND FUEL GASSES.

Figure 2:
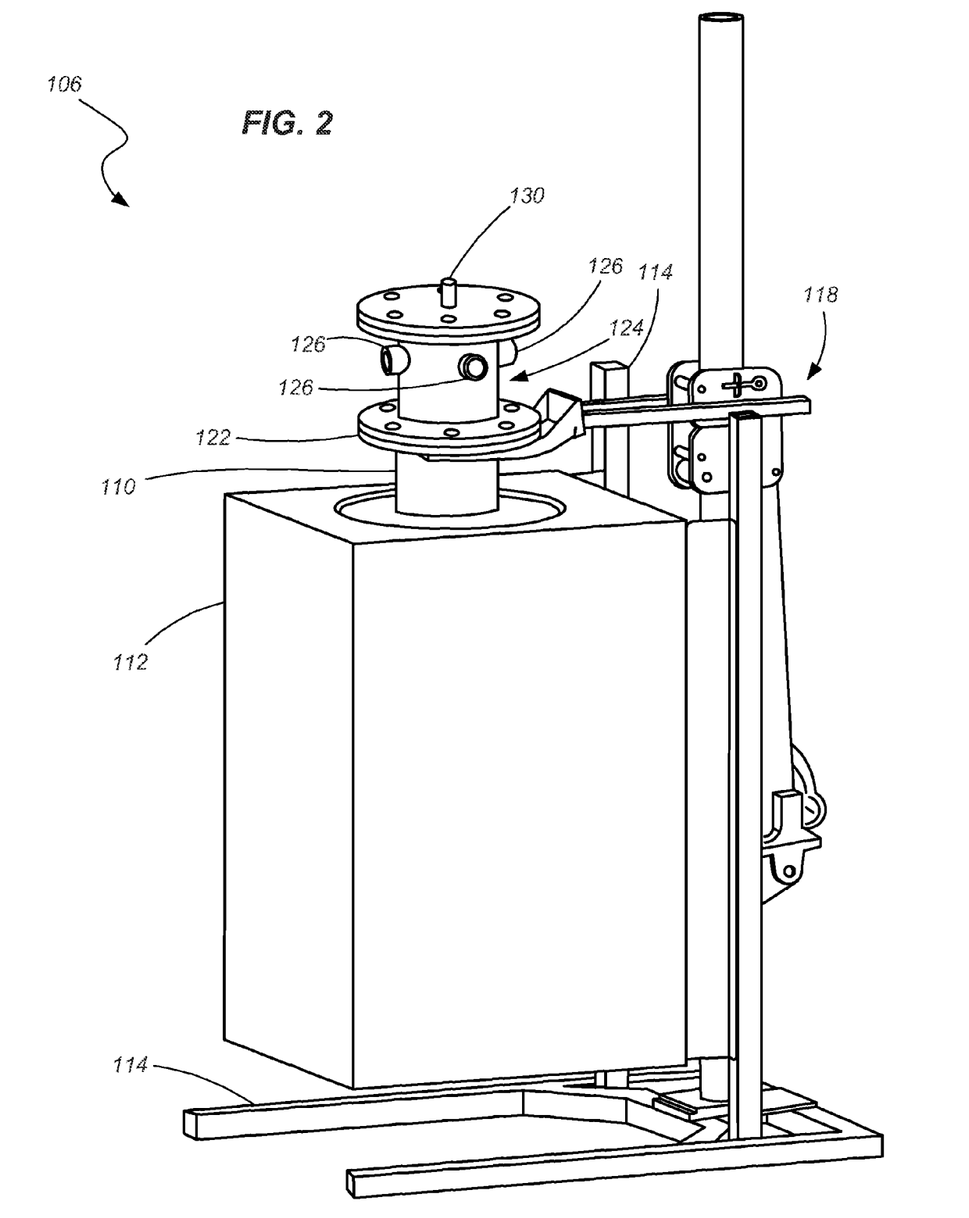
FIG. 2 is a perspective view of a reactor in accordance with an embodiment of the present invention.
Figure 3:
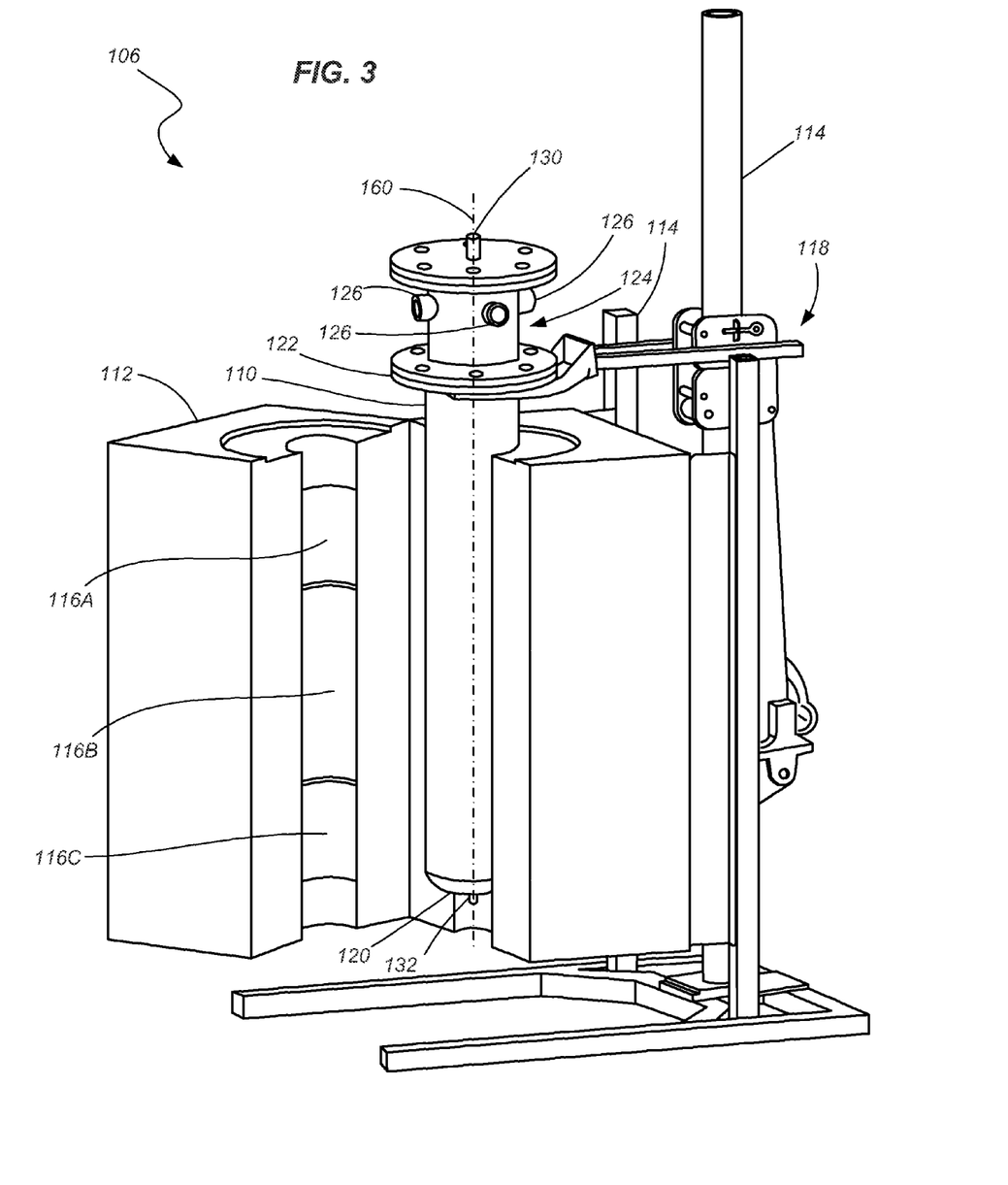
FIG. 3 is a perspective view of the reactor shown in FIG. 1 showing a partial cross-section of one of the reactor's components.

Referring now to FIGS. 2 and 3, a reactor 106 is shown in accordance with an embodiment of the present invention. FIG. 2 shows a perspective view of the reactor 106 while FIG. 3 shows the same reactor 106 with one of the components depicted being "split" in cross-section to show additional details. The reactor 106 includes a crucible 110 disposed within a furnace 112 that is mounted to a frame 114. The furnace 112 may include a commercially available furnace such as, for example, a model XST-6-0-24-3C, three zone, hinged vertical tube furnace available from Carbolite, Inc., of Watertown, Wis. In one embodiment, the furnace 112 may be configured to heat the crucible and its contents to a temperature of approximately 900° C. to approximately 930° C. or greater within a desired time period. Additionally, the furnace 112 may include multiple zones, shown as zones 116A-116C (FIG. 3) that are individually controllable to enable focused heating at specified locations along the length of the crucible 110. While three different zones 116A-116C are shown in FIG. 3, furnaces with more or fewer zones may be utilized.

A lifting mechanism 118 may be associated with the frame 114 to position and hold the crucible 110 at a desired elevation relative to the furnace 112. The lifting mechanism 118 may also be configured to lift the crucible out of the furnace 112 when desired for cleaning, repair or replacement.

The crucible 110 may be formed as a substantially cylindrical member. For example, in one embodiment the crucible 110 may be formed from 304 stainless steel pipe having a cap 120 at one end and a flange 122 at the other end for connection with input and output systems. In certain embodiments, the crucible 110 may be approximately 3 feet long and formed of 3 inch or 5 inch schedule 10 pipe. An exhaust gas spool 124 is coupled with the upper flange 122 of the crucible 110. The spool 124 may be configured with one or more gas outlets 126 to exhaust gasses produced by reactions taking place within the crucible 110. Additionally, the spool 124 may be configured to support internal components (e.g., downtube structure) such as will be described in further detail below. One or more inlets 130 may be associated with the spool for receiving process materials such as the hydrocarbon material (e.g., resid). In some embodiments, the spool 124, the inlets 130 and outlets 126 may be covered with an insulating material or even wrapped with a heating element (e.g., tubing conveying a thermally conductive medium, electrical heat tape or other heating devices) to assist in maintaining any fluids flowing therethrough at a desired temperature. Another inlet 132 may be located at the bottom of the crucible 110, such as in the end cap 120, to introduce other process materials an oxidizing material such as water in steam form) into the crucible 110. As with the spool 124, the piping and other components associated with the inlet 132 at the bottom of the crucible 110 may be insulated or heated to improve thermal performance of the system.

Figure 4:
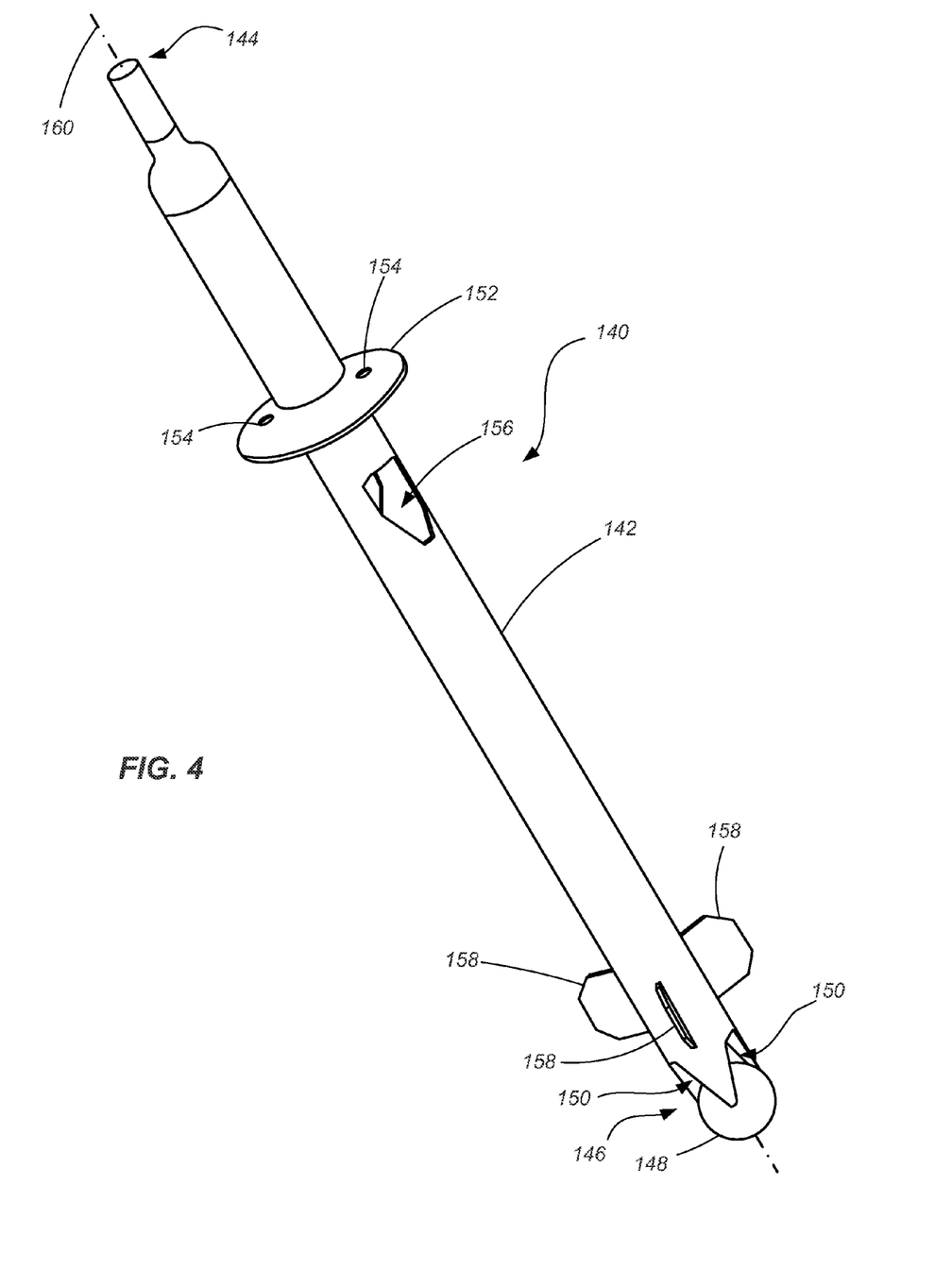
FIG. 4 is a perspective view of a component that may be used in the reactor shown in FIGS. 2 and 3 in accordance with an embodiment of the present invention.

Referring to FIG. 4 various internal components positioned within the crucible are shown and described. FIG. 4 shows a perspective view of a tube structure, referred to generally herein as a downtube 140. The downtube 140 is used in introducing the resid material into the salt bath contained within the crucible 110. Additionally, as will be set forth below, the downtube 140 is configured to assist in controlling residence time of the process materials (e.g., water and resid) within the salt bath to provide enhanced reactions within the crucible 110 by providing a recirculation path within the crucible 110.

The downtube 140 includes a conduit 142 through which process materials are conveyed from the supply (e.g., the source of hydrocarbon material 104) into the crucible 110 and, thus, into the molten salt bath. The conduit 142 may be a pipe or tube formed of a material that is able to withstand corrosive environments, high temperatures and high pressures. For example, the conduit 142, as well as other components of the downtube 140, may be formed of a stainless steel material. A first end 144 of the downtube 140 may be structurally coupled with the spool 124 and placed in fluid connection with one or more inlets 130 of the spool 124. A second end 146 of the downtube 140 may include a baffle or flow diverter 148 and a plurality of openings 150 formed near the flow diverter 148. The openings may be sized, shaped and configured to provide free flow of the materials flowing through the downtube 140 into the crucible 110 while also minimizing the potential capture or trapping of any solids that may circulate through the downtube 140. As seen in the embodiment shown in FIG. 4, the flow diverter 148 may be formed as a substantially spherical member. However, the flow diverter 148 may be configured to exhibit other geometries including, for example, conical, convex or flat. The flow diverter 148 is structured to divert the flow of process materials from their downward path through the conduit 142 and help disperse the process materials from the conduit 142 in a more radial direction near the bottom of the crucible 110.

The downtube 140 also includes a splash guard 152 coupled with the conduit 142. The splash guard 152 is positioned on the conduit 142 based on an anticipated level of the various constituents within the crucible 110 during operation of the reactor 106 (e.g., the salt bath containing steam and resid components). The splash guard 152 helps to prevent liquid from splashing from the salt bath onto upper surfaces of the crucible 110 which may be cooler than the salt bath. If the salt bath splashes onto these surfaces that have a reduced temperature, the splashed liquid can solidify on the upper, interior surfaces of the crucible and, at a minimum, reduce the molten salt levels and possibly impeding or totally preventing gas flows. One or more openings 154 may be formed within the splash guard 152 to enable gas to rise through the crucible 110 to the outlets 126 of the spool 124. Additionally, the splash guard 152 may be sized to provide a small space between itself and the crucible walls (e.g., forming an annulus) to also provide for passage of gasses.

One or more weirs 156, or recirculation inlets, may be formed in the conduit 142. In one embodiment, the weirs 156 may be located near the splash guard 152 and between the splash guard 152 and the second end 146 of the conduit 142. As will be discussed in further detail below, the weirs 156 provide a recirculation path for the molten salt within the crucible. In one embodiment, the weirs 156 may include a lower section that is generally tapered. With this configuration, as the molten salt level raises (e.g., because of the addition of resid material and the formation of gas bubbles within the salt bath), the widening geometry of the weirs provides for an increased flow of recirculated molten salt into the conduit 142.

A plurality of fins or guide members 158 are coupled to the conduit 142 and extend radially outward therefrom. The guide members 158 help to position the downtube 140 within the crucible 110 and keep it substantially centered along, or coaxial with, a longitudinal axis 160 of the crucible 110. As shown in FIG. 4, the guide members 158 may be positioned near the second end 146 of the conduit 142, such as adjacent the openings 150 and/or the flow diverter 148. However, the guide members 158 may be positioned at other longitudinal locations on the conduit 142. Guide members 158 may be, for example, welded to the conduit 142, or otherwise attached using means and processes known to those of ordinary skill in the art which are able to withstand the temperatures, pressures and chemical conditions experienced within the crucible 110. As shown in FIG. 4, there may be three guide members 158 positioned at substantially equal angles about the conduit 142 (e.g., approximately 120° apart). However, other arrangements of guide members 158 may be used, including a different number, spacing or positioning of the guide members 158.

In one embodiment, the cross-sectional area of the conduit 142, as taken perpendicular to the longitudinal axis 160 of the crucible 110 (see FIG. 4), is approximately half that of the cross-section area of the crucible 110 when taken in the same direction. In such an embodiment, the mass flow of the liquid flowing up the annulus defined between the conduit 142 and the inside surface of the crucible 110 may be approximately equal to the mass flow of liquid Do wing down the conduit. It is noted that the apparent volume within the annulus will be larger because of the gas bubbles within the salt bath, the gas leaving the salt bath to exit the reactor 106 while the liquid is left to circulate back through the downtube 140. Of course other ratios of the cross-sectional areas may be utilized depending, for example, on the types of materials, the mixture ratios of materials, and the viscosity of the materials within the crucible 110 as well as the desired recirculation rate through the conduit 142 of the downtube 140.

Figure 5:
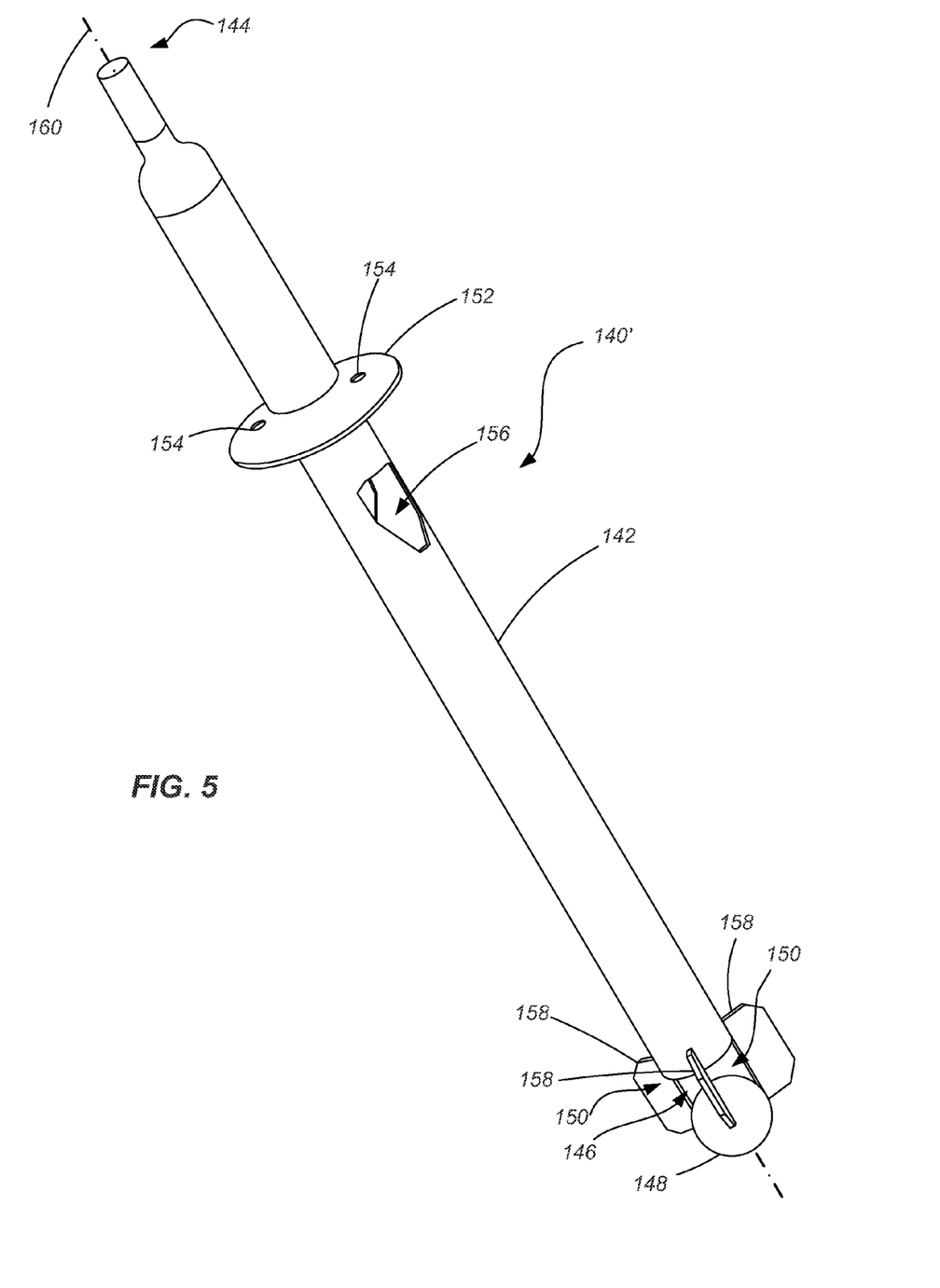
FIG. 5 is a perspective view of a component that may be used in the reactor shown in FIGS. 2 and 3 in accordance with an embodiment of the present invention.

Referring to FIG. 5, another downtube 140' is shown in accordance with another embodiment of the present invention. The downtube 140' is substantially similar to the downtube 140 shown in FIG. 4, having a conduit 142 with a first end 144, a second end 146, a splash guard 152 and weirs 154. However, the flow diverter 148 is not in direct contact with the conduit 142. Rather, the flow diverter 148 is spaced from the second end 144 of the conduit 142 and the guide members 158 are coupled to both the conduit 142 and the flow diverter 148. Openings 150 are formed between the second end 146 of the conduit 142 and the flow diverter 148, defined in part by the guide members 158, as an outlet for material flowing through the conduit 142.

Figure 6:
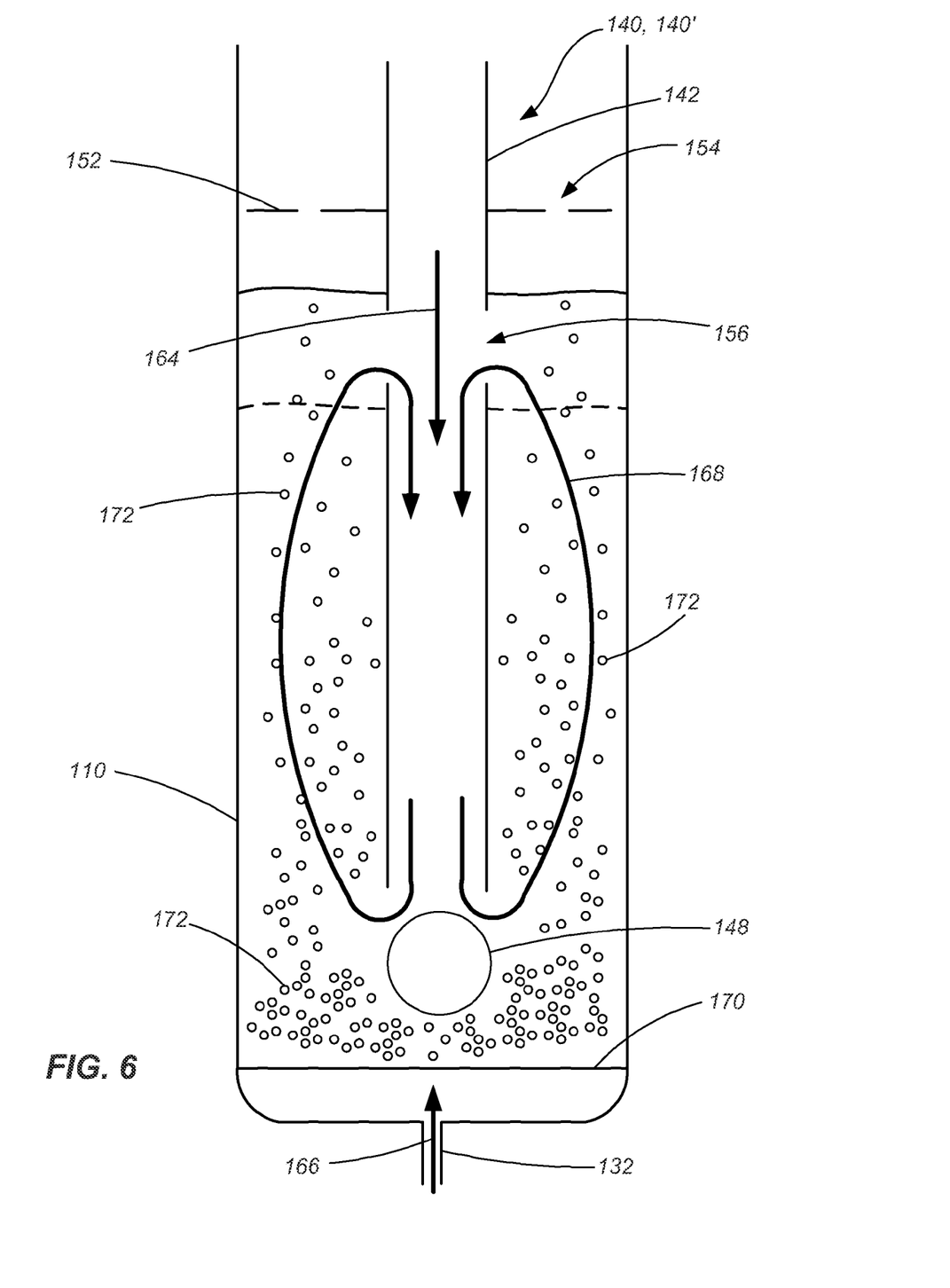
FIG. 6 is a schematic diagram showing the flow of materials within a reactor in accordance with an embodiment of the present invention.

Referring now to FIG. 6, a schematic is shown with the downtube 140 (or 140') positioned within the internal space of crucible 110. A reactant component (e.g., resid) is introduced through the conduit 142 of the downtube, such as by injection under pressure as indicated by arrow 164. In other embodiments, the material may be introduced through the conduit 142 without pressure, such as by letting it drip. Initially, the liquid level of the salt bath will be below the elevation of the weirs 156 as indicated by dashed lines in FIG. 6.

Another reactant component (e.g., water) may be introduced at or near the bottom of the crucible 110. For example, steam may be introduced through the inlet 132 at the bottom of the crucible 110 as indicated by arrow 166. A porous disc 170 may be positioned inside the bottom of the crucible 110 above the inlet 132. Steam passing through the disc 170 will enter the salt bath within the crucible as a column of small bubbles 172. For example, in one embodiment the bubbles may be formed to exhibit approximately 1/16 inch diameters. The introduction of bubbles 172 into the salt bath causes the liquid level to rise. The rising column of liquid, entrained with gas bubbles 172, rises until it encounters the weirs 156 and flows into the conduit 142 through the weirs 156 as the gasses escape the liquid. Gasses escape the liquid and flow through the apertures 154 of the splash guard 152 and through the annulus formed between the splash guard 152 and the inside surface of the crucible 110. Ultimately, the gasses exit through the outlets 126 of the spool for further processing (see FIGS. 2 and 3).

The introduction of the gas bubbles 172 into the salt bath, in conjunction with the weirs 156 formed in the conduit 142 of the downtube 140, sets up a circulation of the salt bath that continually introduces the bath to new bubble sets. The introduction of small bubbles 172 of steam (or other reaction component gasses) will increase the exposure or contact area of the oxidizing material with the liquid of the salt bath (including the resid or other reaction components) and will improve the efficiency of the chemical reactions (e.g., the conversion of sodium carbonate to sodium hydroxide).

As previously discussed, the flow diverter 148 assists in dispersing materials flowing through the conduit 142 into the crucible in a more radial direction. Additionally, the flow diverter 148 also causes the steam or other reaction components flowing through the porous disc 170 to flow outward to mix with the other reaction components (e.g., the resid). Without the flow diverter 148, the reaction components introduced by the inlet 132 at the bottom of the crucible 110 would flow directly into the reaction components flowing out the bottom of the conduit 142 and the mixture of the components (and, thus, their reaction) would be less than desired. Additionally, without the flow diverter 148, gas bubbles could flow upward through the conduit 142 possibly hindering recirculation of the liquid through the conduit 142.

The rotating or recirculating action of the salt bath will cause a natural folding of the resid (or other reaction components) onto the catalyst materials, drawing it deeply into the molten bath. Considering the example of a salt bath comprising sodium carbonate with resid and. water as reaction components introduced into the salt bath, the continued movement of the liquid will keep the sodium carbonate and hydroxide salts (produced by the chemical reactions) thoroughly mixed and will significantly reduce the opportunity for separation.

It is also noted that, since the entire floor of the crucible is active with discharging bubbles (i.e., from the porous disc 172), this will help to prevent carbon solids from collecting at the bottom of the crucible and the solids will be continually circulated with the salt bath until they are completely dissolved.

Figure 7:
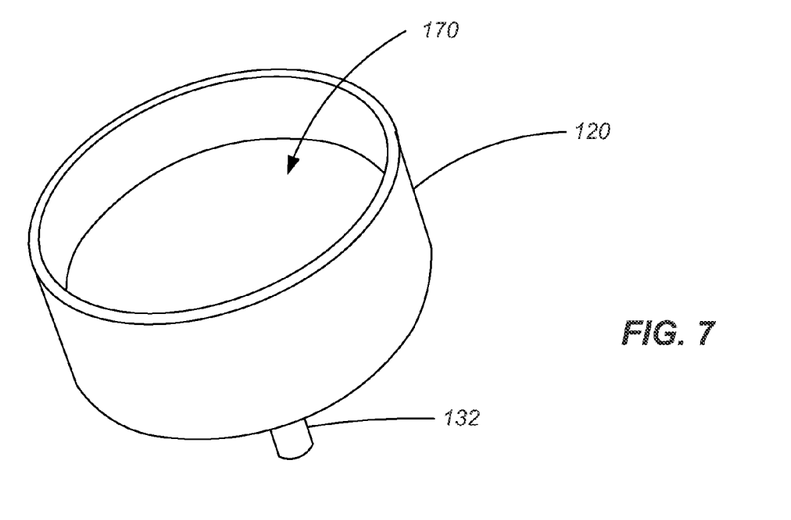
FIG. 7 is a perspective view of reactor components according to an embodiment of the present invention.
Figure 8:
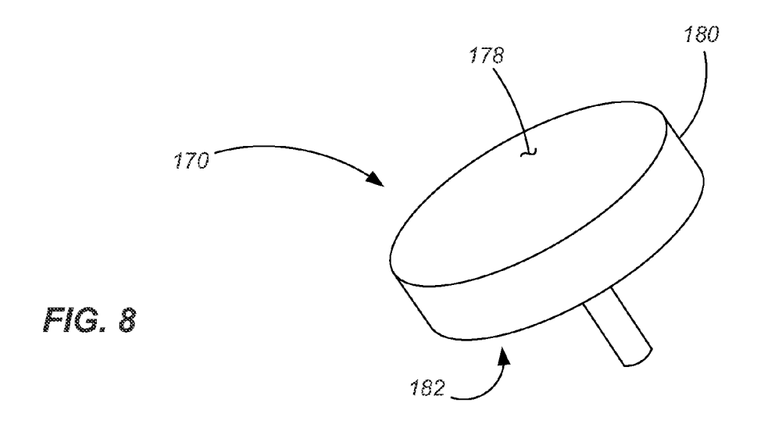
FIG. 8 is a perspective view of a reactor component according to an embodiment of the present invention.
Figure 9:
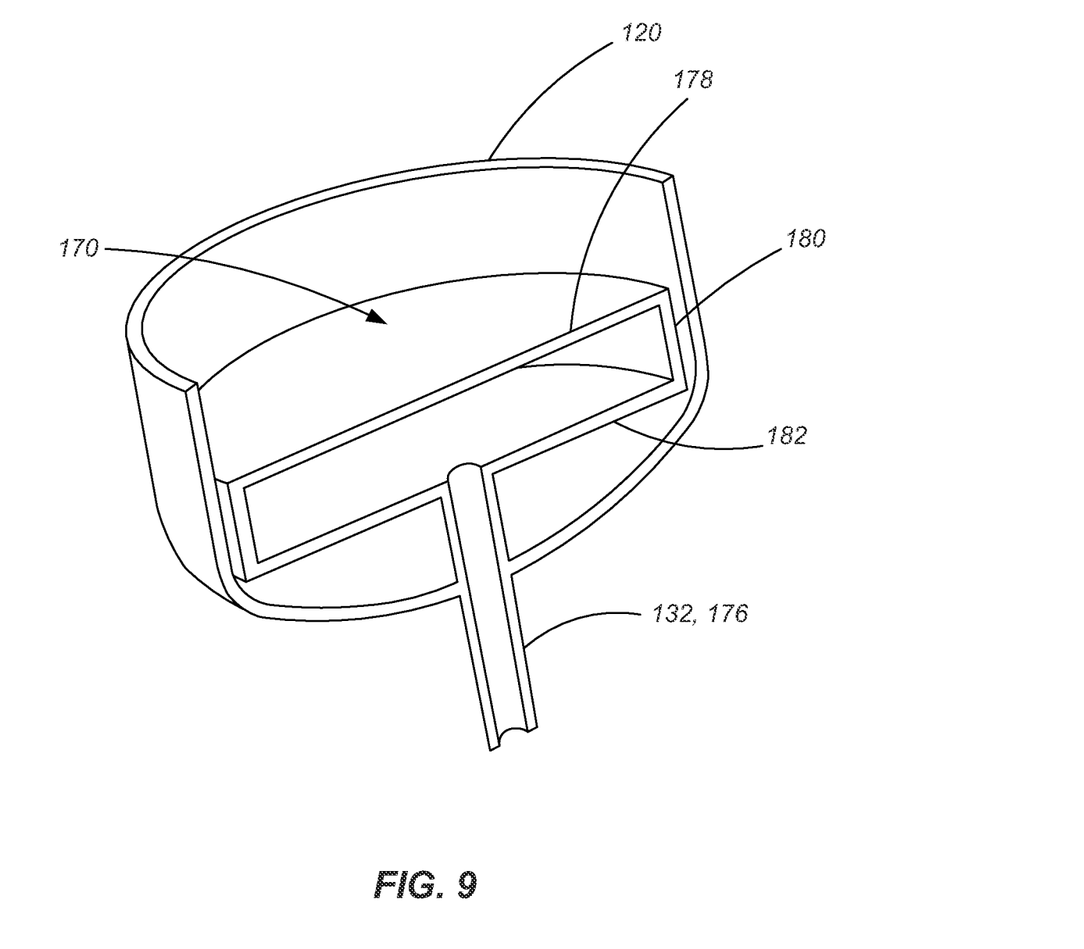
FIG. 9 is a cross-sectional view of various reactor components in accordance with an embodiment of the present invention.

Referring to FIGS. 7-9, a porous disc 170 is shown in accordance with one embodiment of the present invention. The porous disc 170 may include, for example, a stainless steel mesh or other material configured to enable steam or other reaction components to flow therethrough and form a plurality of bubbles as described above. In one particular embodiment, the porous disc 170 may be exhibit a diameter of approximately 4 inches, a thickness of approximately 1/8 inch, and a pore size of approximately 0.5 micro inch. Of course, the porous disc 170 may exhibit other configurations including different pore sizes.

The porous disc 170 may be formed as a substantially hollow body with an inlet 176 in communication with the interior of the hollow body. As shown in FIG. 9, the inlet 176 may extend through a bottom portion of the crucible 110 (e.g., the end cap 120), acting as the inlet 132 to the crucible 110 as discussed above with respect to FIG. 2. In another embodiment, the inlet 176 may be in communication with, and sealingly coupled with the inlet 132 of the crucible 110.

In one embodiment, the porous disc 170 may be configured such that the upper wall 178 of the disc 170 is porous or allows fluid material to pass through. In another embodiment, other portions of the porous disc 170, such as the side wall 180, the bottom wall 182, or both, may be formed as porous structures in addition to, or in lieu of the top wall being 178 a porous structure. The disc may be formed to substantially spread across the cross-sectional area of the crucible 110 as taken in a direction substantially perpendicular to the longitudinal axis 160 of the crucible 110. In another embodiment, such as when the side wall 180 and/or the bottom wall of the disc 170 are formed from porous material, the disc 170 may be formed to define an annulus or other space between the sidewall 180 and the wall of the crucible 110.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A reactor comprising:
   a furnace;
   a crucible positioned for heating by the furnace, the crucible defining an interior volume;
   a downtube disposed at least partially within the interior crucible, the downtube including a conduit having an inlet at a first end, an outlet at a second end and at least one opening formed in the conduit between the first end and the second end, the inlet being positioned above an intended operating liquid level within the interior volume, the outlet and at least one opening configured to provide a recirculation path for any liquid material contained within the crucible;
   a reactant inlet and a flow diverter positioned between the reactant inlet and the outlet of the downtube:
   a porous disc structure positioned between the reactant inlet and the outlet of the downtube, wherein the porous disc structure extends substantially completely across a floor of the crucible.

2. The reactor of claim 1, wherein the at least one opening is tapered at one end thereof.

3. The reactor of claim 2, wherein the at least one opening includes a plurality of openings within the conduit between the first and second ends.

4. The reactor of claim 1, wherein the downtube extends substantially along a longitudinal axis of the crucible.

5. The reactor of claim 4, wherein a cross-sectional area of the downtube, as taken substantially perpendicular to the longitudinal axis, is approximately half of a cross-sectional area of the crucible, as taken substantially perpendicular to the longitudinal axis.

6. The reactor of claim 5, wherein the downtube further comprises a plurality of guide members coupled with the conduit, the plurality of guide members being sized and positioned to maintain the conduit substantially along the longitudinal axis.

7. A reactor comprising:
   a furnace;
   a crucible positioned for heating by the furnace, the crucible defining an interior volume;
   a downtube disposed at least partially within the interior crucible and extending substantially along a longitudinal axis of the crucible, the downtube including a conduit having an inlet at a first end, an outlet at a second end and at least one opening formed in the conduit between the first end and the second end, the outlet and at least one opening configured to provide a recirculation path for any liquid material contained within the crucible, wherein a cross-sectional area of the downtube, as taken substantially perpendicular to the longitudinal axis, is approximately half of a cross-sectional area of the crucible, as taken substantially perpendicular to the longitudinal axis, and wherein the downtube further comprises a plurality of guide members coupled with the conduit, the plurality of guide members being sized and positioned to maintain the conduit substantially along the longitudinal axis; and
   a spool structure coupled with the crucible, the spool structure having at least one outlet and at least one inlet.

8. The reactor of claim 7, wherein an inlet of conduit is in fluid communication with the at least one inlet of the spool structure.

9. The reactor of claim 6, further comprising a flow diversion structure positioned adjacent the second end of the conduit.

10. The reactor of claim 9, wherein the flow diversion structure exhibits a substantially spherical geometry.

11. The reactor of claim 10, wherein the flow diversion structure is spaced apart from the second end of the conduit and wherein each of the plurality of guide members are coupled between the conduit and the flow diversion structure.

12. A reactor comprising:
   a furnace;
   a crucible positioned for heating by the furnace, the crucible defining an interior volume;
   a downtube disposed at least partially within the interior crucible and extending substantially along a longitudinal axis of the crucible, the downtube including a conduit having an inlet at a first end, an outlet at a second end and at least one opening formed in the conduit between the first end and the second end, the outlet and at least one opening configured to provide a recirculation path for any liquid material contained within the crucible, wherein a cross-sectional area of the downtube, as taken substantially perpendicular to the longitudinal axis, is approximately half of a cross-sectional area of the crucible, as taken substantially perpendicular to the longitudinal axis, and wherein the downtube further comprises a plurality of guide members coupled with the conduit, the plurality of guide members being sized and positioned to maintain the conduit substantially along the longitudinal axis;
   a flow diversion structure positioned adjacent the second end of the conduit, wherein the flow diversion structure exhibits a substantially spherical geometry, and wherein the flow diversion structure is spaced apart from the second end of the conduit and wherein each of the plurality of guide members are coupled between the conduit and the flow diversion structure; and
   the crucible further includes a reactant inlet positioned below the second end of the conduit.

13. The reactor of claim 12, further comprising a porous disc structure positioned between the reactant inlet and the second end of the conduit.

14. The reactor of claim 13, further comprising a splash guard coupled with the conduit and positioned between the at least one opening and the first end of the conduit.

15. The reactor of claim 14, wherein the crucible and the downtube are formed from a stainless steel material.

16. The reactor of claim 1, wherein the furnace includes a plurality selectively controllable heating zones.

\* \* \* \* \*